Oct. 11, 1927.

G. N. WAGNER 1,645,362

CIRCUIT CLOSING DEVICE

Filed Feb. 16, 1926

George N. Wagner, INVENTOR.

BY

Geo. P. Kimmel ATTORNEY.

Oct. 11, 1927.  
G. N. WAGNER  
1,645,362  
CIRCUIT CLOSING DEVICE  
Filed Feb. 16, 1926  
2 Sheets-Sheet 2

George N. Wagner, INVENTOR.

BY

ATTORNEY.

Patented Oct. 11, 1927.

1,645,362

UNITED STATES PATENT OFFICE.

GEORGE N. WAGNER, OF LOS ANGELES, CALIFORNIA.

CIRCUIT-CLOSING DEVICE.

Application filed February 16, 1926. Serial No. 88,622.

This invention relates to a circuit closing device designed primarily for closing a normally open circuit for a signal of the audible type to sound the same, more particularly for employment for the closing of the horn circuit of a motor vehicle, but it is to be understood that a circuit closing device in accordance with this invention can be employed for any purpose for which it is found applicable, and the invention has for its object to provide, in a manner as hereinafter set forth, a device of the class referred to for connection to the wheel of a steering mechanism of a motor vehicle to enable the hand of the operator to actuate the device to close the horn circuit to provide for the sounding of the horn, without necessitating the operator from removing his hand from off the steering wheel.

Further objects of the invention are to provide, in a manner as hereinafter set forth, a circuit closing device for the purpose referred to which is simple in its construction and arrangement, strong, durable, compact, readily installed with respect to the steering wheel of the steering mechanism of a motor vehicle, thoroughly efficient in its use, conveniently operated by the hand without removing it from the steering wheel, and comparatively inexpensive to manufacture.

With the foregoing and other objects in view the invention consists of the novel construction, combination and arrangement of parts as hereinafter more specifically described and illustrated in the acompanying drawings wherein is shown an embodiment of the invention, but it is to be understood that changes, variations and modifications can be resorted to which fall within the scope of the claims hereunto appended.

In the drawings wherein like reference characters denote coresponding parts throughout the several views:—

Figure 1:
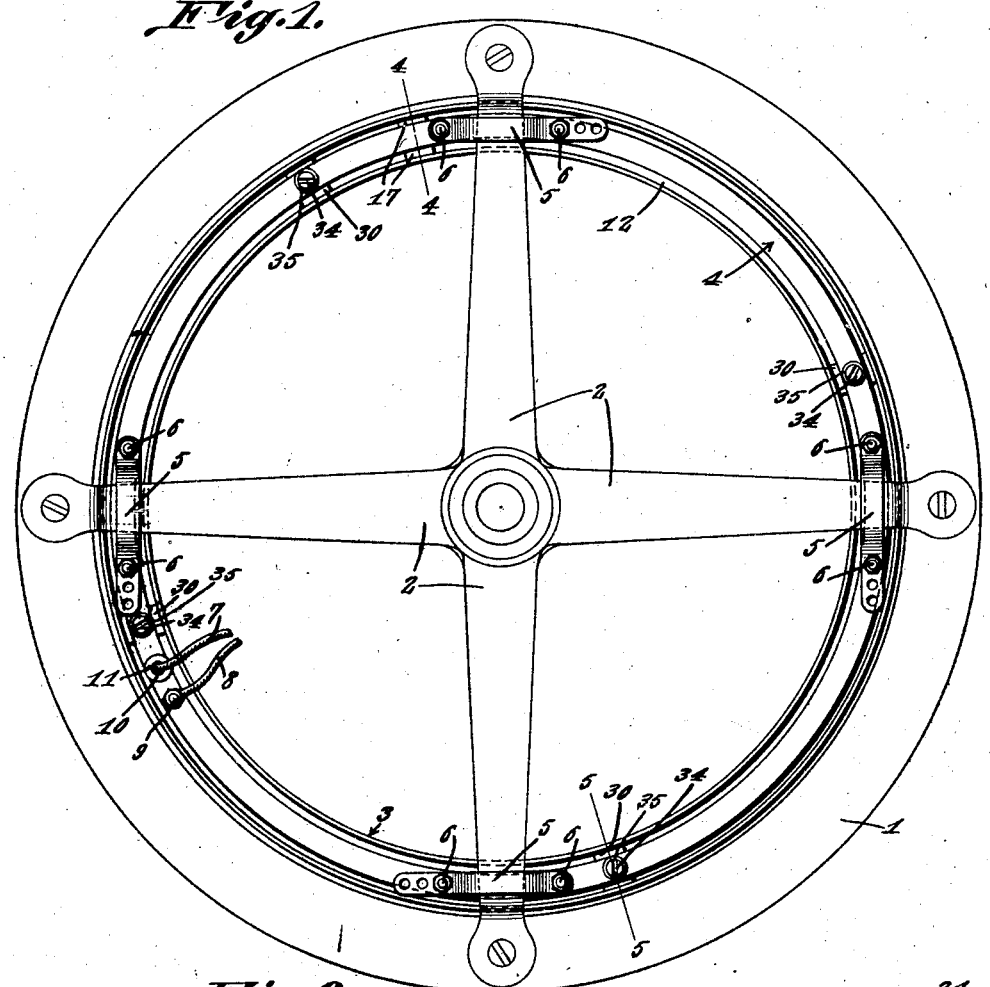
Figure 1 is an inverted plan view of a circuit closing device, in accordance with this invention, showing the adaptation thereof with respect to the steering wheel of a steering mechanism.
Figure 2:
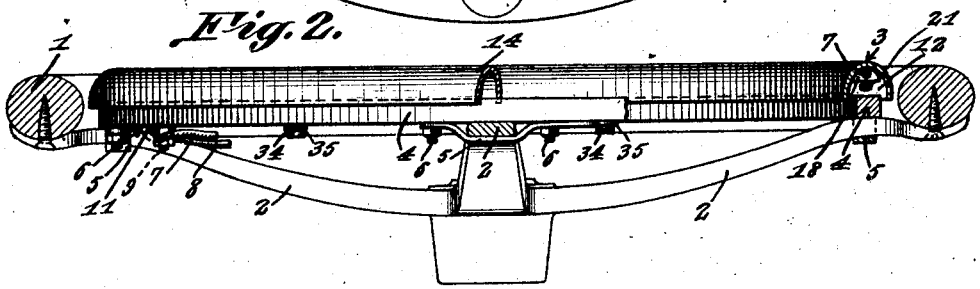
Figure 2 is a sectional elevation of the device showing the adaptation thereof with respect to a steering wheel.
Figure 3:
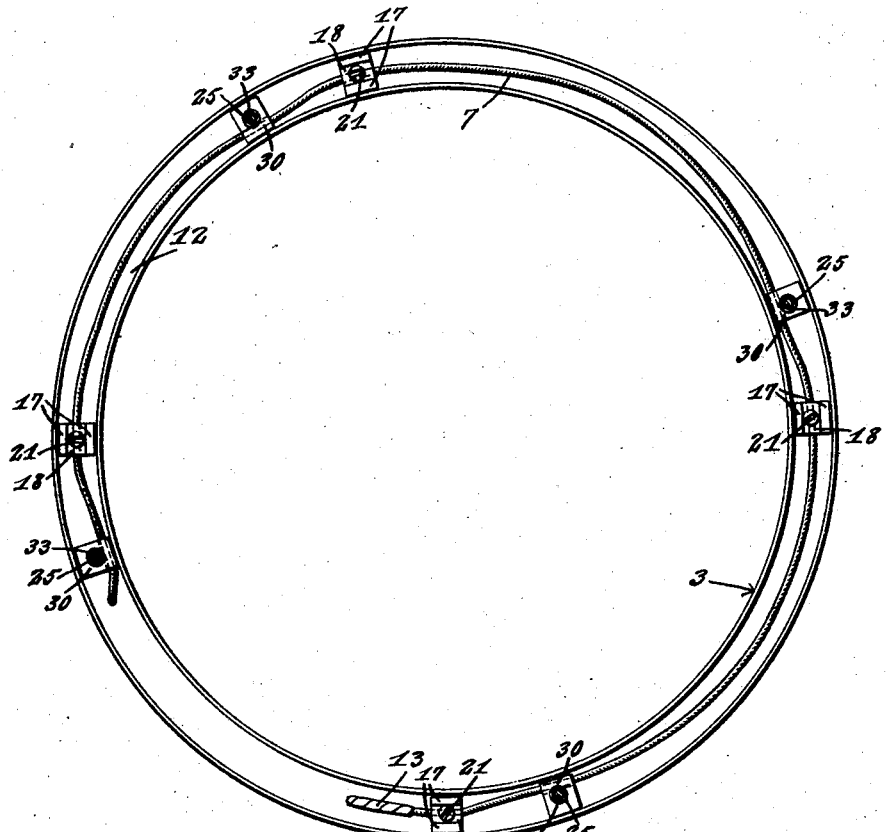
Figure 3 is an inverted plan view of the spring controlled shiftable section of the device.
Figure 4:
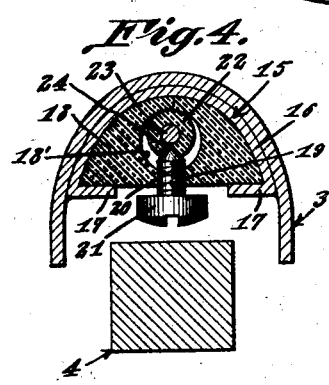
Figure 4 is a section on line 4—4 Figure 1.
Figure 5:
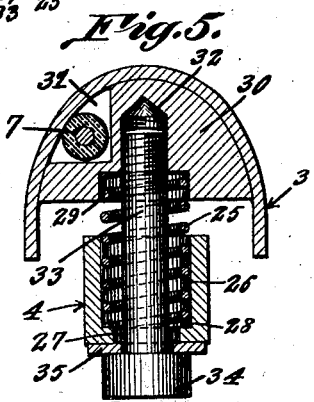
Figure 5 is a section on line 5—5 Figure 1.

Referring to the drawings in detail 1 denotes the annular rim and 2 the spokes of a steering wheel adapted to be connected to the upper end of the post of the steering mechanism. The wheel as is well known, is constructed of non-conducting material.

A circuit closing device, in accordance with this invention, consists of a sectional body portion in the form of an annulus and of a diameter to be positioned within the rim 1 and to be arranged in proximity to the inner side of the rim 1.

The body portion of the device comprises an upper section, referred to generally by the reference character 3, and a lower section referred to generally by the reference character 4. Each of the sections of the body portion is of circular contour and the section 3 is of greater width than the section 4 and is adapted to overlap the same. The section 3 is of semi-oval contour in cross section and the section 4 is square in cross section. The section 3 is hollow and the section 4 solid. The section 3 is constructed of sheet metal of the desired gauge and the section 4 constructed of any suitable conducting material preferably bronze. The inner diameter of the section 3 is less than the inner diameter of the section 4 and the outer diameter of the section 3 is greater than the outer diameter of the section 4. The height of the section 3 is greater than the height of the section 4. The section 4 is mounted upon the top of the spokes 2 and is secured to each of said spokes 2 by a coupling strip 5 which engages the lower face or bottom of a spoke, extends transversely of the latter and is secured at each end to the section 4 by a hold-fast device 6. The section 4 is secured to the spokes of the wheel so as to prevent the rim 1 shifting circumferentially with respect to the section 4 or section 3. Extending through the section 4 and insulated therefrom is a circuit wire connection 7 and connected to the section 4, as well as being in electrical engagement therewith, is a circuit connection 8. The means for connecting the circuit connection 8 to the section 4 is indicated at 9. The circuit connection 8 is secured against the lower face of the section 4. The circuit connection 7 extends through an opening 10 formed by a bushing 11 seated in the section 4, and said circuit connection 7 extends around the channel 12 formed by the section 3. One end of the connection 7 is sealed as at 13.

Secured within the channel 12, at spaced intervals, preferably at equidistant points with respect to each other, is a series of carriers referred to generally by the reference character 15 and each of which consists of a semi-oval shaped strip 16, having each end thereof formed with an inwardly extending right angular flange 17. The flanges 17 are oppositely disposed with respect to each other and provide means for securing within each strip a semi-oval shaped block 18 formed of insulation material and provided centrally with an oval shaped opening 18′ which extends from one end to the other end thereof. The block 18 is further provided in its lower portion with a centrally disposed vertically extending opening 19 having a threaded wall for engagement with the peripherally threaded shank 20 of a headed contact member 21. The circuit connection 7 extends through the opening 18 and piercing the insulation covering 22 of said connection to engage with the conductor 23 in the pointed end 24 of a contact member 21. The contact member 21 not only binds the circuit connection 7 against the top portion of the wall of the opening 18′ but furthermore is in permanent electrical connection with the conductor 23. The carriers 15 are of less height than the height of the section 3. The heads of the contact members 21 are disposed below the flanges 17 and are arranged directly over the section 4. When the section 3 is depressed the heads of the contact members 21 engage the section 4 and close the circuit. Any one of the contact members, when in engagement with the upper face of the section 4, will close the circuit. The contact members 21 are arranged adjacent the spokes 2.

The section 3 is arranged in spaced superposed relation with respect to the section 4, though the medium of a series of controlling or elevating springs for the said section 3 and when the latter is depressed to close the circuit, the lowering action of the section 3 is had against the action of the controlling springs therefor. The downward movement of the section 3 relative to the section 4 is arrested by the engagement of a contact member with the section 4. Each of the controlling springs is indicated at 25 and each of said springs are arranged within and project from a socket 26 formed in the section 4 and opening at the upper face thereof. The bottom of the socket 26 is provided with a centrally disposed opening 27 of less diameter than the diameter of the socket thereby providing an annular shoulder 28 upon which the lower end of the spring 25 seats. The upper end of each spring 25 extends into a socket 29 of a semi-oval shaped coupling block 30 which is secured to the wall of the channel 12 and is of slightly greater height than the carrier 15. The coupling block 30 at one side thereof is cut away to provide a passage 31 for the circuit connection 7. The block 30 is furthermore provided with a socket 32, which is of less diameter than the socket 29 and which opens into the latter. The wall of the socket 32 is threaded for engagement with the peripheral threads of the shank 33 of a vertically disposed headed bolt 34 which extends up through the opening 27, through the spring 25, as well as the socket 29 and threadedly engages with the wall of the socket 32. Interposed between the head of the bolt 34 and the lower face of the section 4 is a washer 35. The bolt 34 provides means for slidably connecting the section 3 to the section 4 and said section 3 is maintained in spaced relation above and with respect to section 4 by the controlling springs 25. The bolt 30 provides means for coupling the circuit connection to the section 3. Preferably the coupling blocks 30 are arranged in proximity to the carrier 15, but spaced a substantial distance therefrom and by the arrangement of the blocks 18 and 30 in the manner as shown, portions of the circuit connection 7 are disposed centrally with respect to the section 3 and other portions thereof eccentrically with respect to the section 3

The construction of the circuit closing device as shown and described provide means whereby the operator of the car can depress the section 3 from any side thereof, without the operator removing his hand from the rim 1 of the wheel, and when a portion of the section 3 is depressed, one of the contact members 21 will engage the section 4, thereby closing the horn circuit and providing for the sounding of the horn. It does not necessitate the operator to remove his hand from the steering wheel for the purpose of closing the circuit, as the wheel can be gripped by the same hand which provides for the depressing of the section 3 to close the circuit.

It is thought the many advantages of a circuit closing device in accordance with this invention, can be readily understood, and although the preferred embodiment of the invention is as illustrated and described, yet it is to be understood that changes in the details of construction can be had which will fall within the scope of the invention as claimed.

What I claim is:—

A circuit closing device for the purpose set forth adapted to be carried by the steering wheel of a motor vehicle, comprising a stationary lower annulus of conducting material in a normally open circuit, means for fixedly securing said annulus upon the spokes of the steering wheel, a bodily depressible, upper hollow annulus of concave cross section having its lower part opposing and spaced from the sides of the lower annulus, an insulated electrical conductor extending through the lower annulus and positioned within the upper annulus circumferentially thereof and further having one end thereof fixed to said upper annulus, spaced coupling blocks secured within the upper annulus and having a portion of the corresponding sides thereof cut away for the passage of said conductor, carriers of non-conducting material secured within the upper annulus, alternately disposed with respect to said blocks and each having a centrally arranged, horizontally disposed opening for the passage of said conductor, contact members secured to and depending from said carrier, in electrical contact with said conductor and normally spaced from said lower annulus and contacting with the latter to close the circuit when the upper annulus is depressed, said coupling members secured to the blocks and slidably extending through the lower annulus, and coil springs surrounding said members and interposed between said annuli for maintaing the contacts normally spaced from the lower annulus.

In testimony whereof, I affix my signature hereto.

GEORGE N. WAGNER.